US012663801B2

(12) United States Patent
Huang et al.

(10) Patent No.: US 12,663,801 B2
(45) Date of Patent: Jun. 23, 2026

(54) VISUAL IDENTIFICATION POSITIONING SYSTEM OF MOWING ROBOT

(71) Applicant: DURQ MACHINERY CORP., Taichung City (TW)

(72) Inventors: Yu-Chia Huang, Taichung City (TW); Fu-Peng Chou, Taichung City (TW)

(73) Assignee: DURQ MACHINERY CORP., Taichung City (TW)

( * ) Notice: Subject to any disclaimer, the term of this patent is extended or adjusted under 35 U.S.C. 154(b) by 11 days.

(21) Appl. No.: 18/619,753

(22) Filed: Mar. 28, 2024

(65) Prior Publication Data

US 2024/0375286 A1     Nov. 14, 2024

(30) Foreign Application Priority Data

May 12, 2023    (DE) ............................ 102023112559

(51) Int. Cl.
| | |
|---|---|
| *G05D 1/244* | (2024.01) |
| *A01D 34/00* | (2006.01) |
| *B25J 9/16* | (2006.01) |
| *G05D 105/15* | (2024.01) |
| *G05D 107/20* | (2024.01) |

(52) U.S. Cl.
CPC ........... *G05D 1/244* (2024.01); *A01D 34/008* (2013.01); *B25J 9/1697* (2013.01); *G05D 2105/15* (2024.01); *G05D 2107/23* (2024.01)

(58) Field of Classification Search
CPC .. G05D 1/244; G05D 1/6484; G05D 2105/15; G05D 2107/23; G05D 2109/10; G05D 2111/10; A01D 34/008; B25J 9/1697
See application file for complete search history.

(56) References Cited

U.S. PATENT DOCUMENTS

| | | | |
|---|---|---|---|
| 2015/0201555 A1* | 7/2015 | Willgert | ............... G05D 1/0274 |
| | | | 701/26 |
| 2016/0113195 A1* | 4/2016 | Das | ...................... G05D 1/0265 |
| | | | 701/25 |

(Continued)

FOREIGN PATENT DOCUMENTS

| | | | |
|---|---|---|---|
| CN | 103076802 B | * | 1/2016 |
| CN | 113207412 A | | 8/2021 |

*Primary Examiner* — Aniss Chad
(74) *Attorney, Agent, or Firm* — MUNCY, GEISSLER, OLDS & LOWE, P.C.

(57) ABSTRACT

A visual identification positioning system includes a first positioning member, a second positioning member, and a mowing robot. The mowing robot has a visual identification unit and a computation unit. The visual identification unit identifies a first identification feature of the first positioning member and a second identification feature of the second positioning member to generate first and second signals to the computation unit. The computation unit computes a first coordinate, a second coordinate, a first distance between the mowing robot and the first coordinate, and a second distance between the mowing robot and the second coordinate according to the first and second signals, and defines first and second ranges with the first and second coordinates as centers according to the first and second distances, and computes a coordinate of an intersection of the first and second ranges as a current location coordinate of the mowing robot.

8 Claims, 9 Drawing Sheets

(56)          References Cited

U.S. PATENT DOCUMENTS

| 2017/0108872 A1* | 4/2017 | Mannefred | .......... | G05D 1/0234 |
| 2017/0150676 A1* | 6/2017 | Yamauchi | ............ | G05D 1/0219 |
| 2017/0303466 A1* | 10/2017 | Grufman | .................. | G06T 7/80 |
| 2020/0041601 A1* | 2/2020 | Ko | ........................... | G05D 1/02 |
| 2021/0100160 A1* | 4/2021 | Kang | .................. | G05D 1/0219 |

* cited by examiner

VISUAL IDENTIFICATION POSITIONING SYSTEM OF MOWING ROBOT

BACKGROUND OF THE INVENTION

1. Field of the Invention

The present invention relates to mowing robots and more particularly, to a visual identification positioning system of a mowing robot.

2. Description of the Related Art

In order for a mowing robot to move to a target point, the invention patent CN113207412A discloses a target tracking method based on a visual servo mowing robot and the visual servo mowing robot. The aforesaid patent comprises the following steps: enabling a target point to be positioned in a visual field range of a rotary camera, and acquiring a first included angle between the course of the mowing robot (this means the current driving direction of the mowing robot) and the optical axis of the rotary camera (this means the centerline of the beam at the center point of the rotary camera) and a second included angle between a preset track of the target point in the visual field range of the rotary camera and the optical axis, and adjusting the course of the mowing robot according to the first included angle and the second included angle for enabling the mowing robot to continuously track the target point and gradually reach the target point. However, the aforesaid prior art has a relatively troublesome positioning way and a higher cost.

SUMMARY OF THE INVENTION

It is a primary objective of the present invention to provide a visual identification positioning system for use with a mowing robot, which provides a relatively simple and fast positioning way, and has a lower cost.

To attain the above objective, the visual identification positioning system of the present invention comprises a first positioning member, a second positioning member, and a mowing robot. The first positioning member has a first identification feature. The second positioning member is spaced from the first positioning member and has a second identification feature. The mowing robot includes a visual identification unit and a computation unit. The visual identification unit identifies the first identification feature of the first positioning member and the second identification feature of the second positioning member to generate a first signal and a second signal to the computation unit. The computation unit computes a first coordinate of the first positioning member, a second coordinate of the second positioning member, a first distance between the mowing robot and the first coordinate, and a second distance between the mowing robot and the second coordinate according to the first and second signals, and defines first and second ranges with the first and second coordinates as centers according to the first and second distances, and computes a coordinate of at least one intersection of the first and second ranges as a current location coordinate of the mowing robot.

It can be seen from the above that the visual identification positioning system of the present invention can acquire the current location coordinate of the mowing robot without using satellite positioning, and further, the first and second positioning members are easy to be manufactured in large quantities, such that the visual identification positioning system of the present invention provides a relatively simple and fast positioning way and has a lower cost when compared to the prior art.

In a preferred embodiment of the present invention, the computation unit defines a first boundary between the first and second coordinates according to the first and second signals, and computes a first spaced distance between the mowing robot and the first boundary. When the first spaced distance is zero, the mowing robot cannot cross the first boundary and moves away from the first boundary. In this way, the movable range of the mowing robot can be restricted by the first boundary.

In a preferred embodiment of the present invention, the first and second ranges are circles that are defined with the first and second coordinates as centers and the first and second distances as radiuses, respectively.

In another preferred embodiment of the present invention, the visual identification positioning system further comprises a third positioning member spaced from the first and second positioning members and having a third identification feature. The visual identification unit identifies the third identification feature of the third positioning member to generate a third signal to the computation unit. The computation unit computes a third coordinate of the third positioning member, a third distance between the mowing robot and the third coordinate, and defines the first range, the second range, and a third range with the first, second, and third coordinates as centers according to the first, second and third distances, and computes a coordinate of an intersection of the first, second, and third ranges as the current location coordinate of the mowing robot. In this way, the current location coordinate of the mowing robot can be more accurate by means of the first, second and third ranges defined by the first, second and third positioning members.

In another preferred embodiment of the present invention, the computation unit defines the first boundary between the first and second coordinates, a second boundary between the second and third coordinates, and a third boundary between the first and third coordinates according the first, second, and third signals, and computes the first spaced distance between the mowing robot and the first boundary, a second spaced distance between the mowing robot and the second boundary, and a third spaced distance between the mowing robot and the third boundary. When one of the first, second, and third spaced distances is zero, the mowing robot cannot cross one of the first, second, and third boundaries and moves away from one of the first, second, and third boundaries. In this way, the movable range of the mowing robot can be restricted more precisely by the first, second, and third boundaries.

To attain the above objective, the present invention provides another visual identification positioning system comprising a first positioning member, a second positioning member, at least one camera lens, a transmission member, and a mowing robot. The first positioning member has a first identification feature. The second positioning member is spaced from the first positioning member and has a second identification feature. The camera lens shoots the first identification feature of the first positioning member and the second identification feature of the second positioning member. The transmission member receives and transmits the first and second identification features shot by the camera lens. The mowing robot includes a visual identification unit and a computation unit. The visual identification unit receives the first and second identification features transmitted by the transmission member and generates a first signal and a second signal to the computation unit. The computation unit computes a first coordinate of the first positioning member, a second coordinate of the second positioning member, a first distance between the mowing robot and the first coordinate, and a second distance between the mowing robot and the first coordinate according to the first and second signals, and defines first and second ranges with the first and second coordinates as centers according to the first and second distances, and computes a coordinate of at least one intersection of the first and second ranges as a current location coordinate of the mowing robot.

It can be seen from the above that the visual identification positioning system of the present invention can acquire the current location coordinate of the mowing robot without using satellite positioning, and further, the first and second positioning members are easy to be manufactured in large quantities, such that the visual identification positioning system of the present invention provides a relatively simple and fast positioning way and has a lower cost when compared to the prior art.

In another preferred embodiment of the present invention, the camera lens shoots a mowing area and a boundary of the mowing area. The transmission member transmits an information corresponding to the mowing area and the boundary to the computing unit. When the mowing robot moves to the boundary of the mowing area, the mowing robot moves along the boundary of the mowing area, and a new boundary of the mowing area is defined by a current location coordinate of the mowing robot moving along the boundary. In this way, the camera lens does not repeatedly shoot the mowing area and the boundary of the mowing area, and further, the mowing robot is ensured to move to the boundary of the mowing area at most without going beyond the boundary.

Other advantages and features of the present invention will be fully understood by reference to the following specification in conjunction with the accompanying drawings, in which like reference signs denote like components of structure.

DETAILED DESCRIPTION OF THE INVENTION

Figure 1:
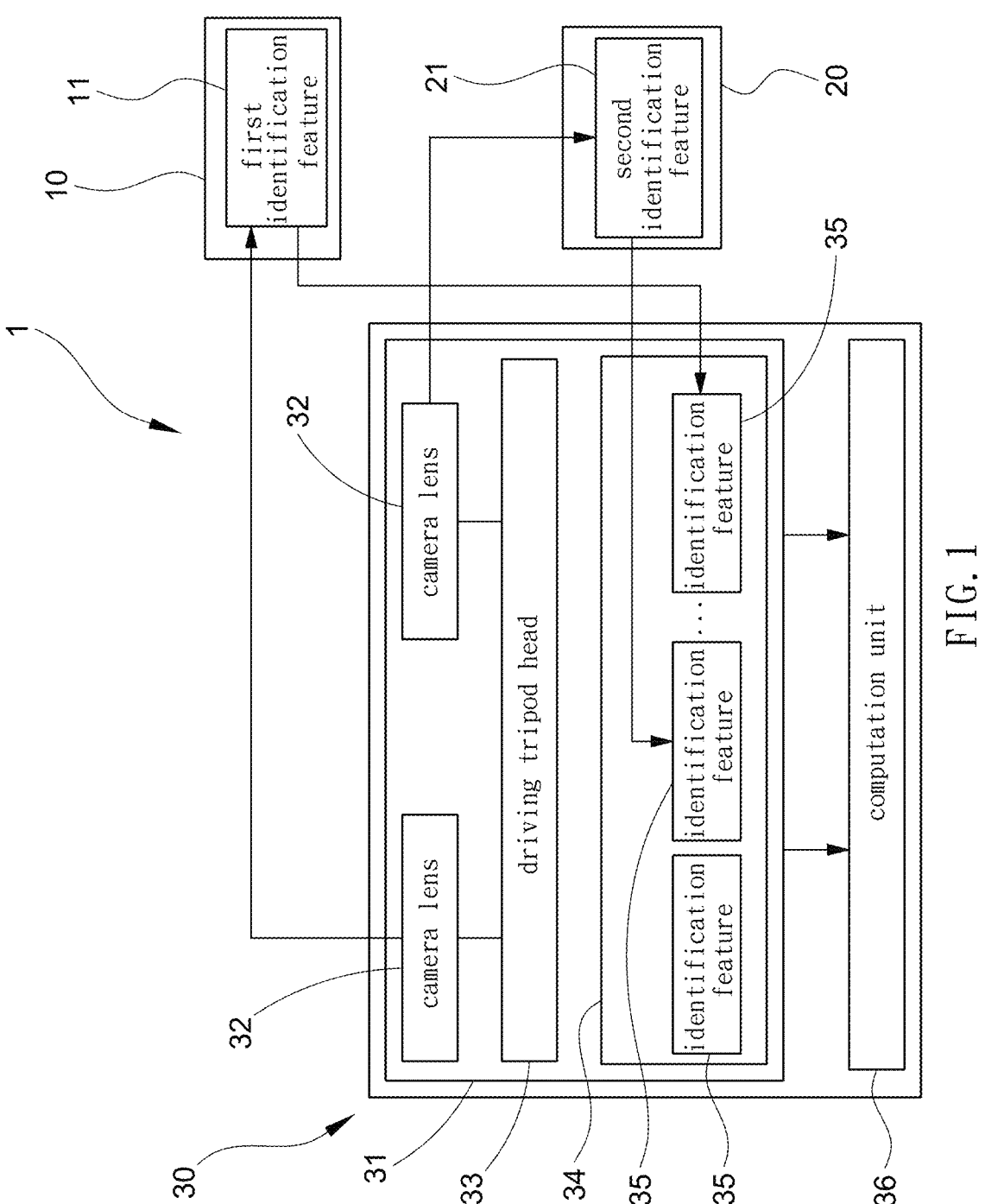
FIG. 1 is a system block diagram of a visual identification positioning system of a first embodiment of the present invention.

Referring to FIG. 1, a visual identification positioning system 1 of a first embodiment of the present invention comprises a first positioning 10, a second positioning member 20, and a mowing robot 30.

Figure 2:
FIG. 2 is a perspective view of the visual identification positioning system of the first embodiment of the present invention, showing that the visual identification unit identifies the first positioning member and the second positioning member.
Figure 2:
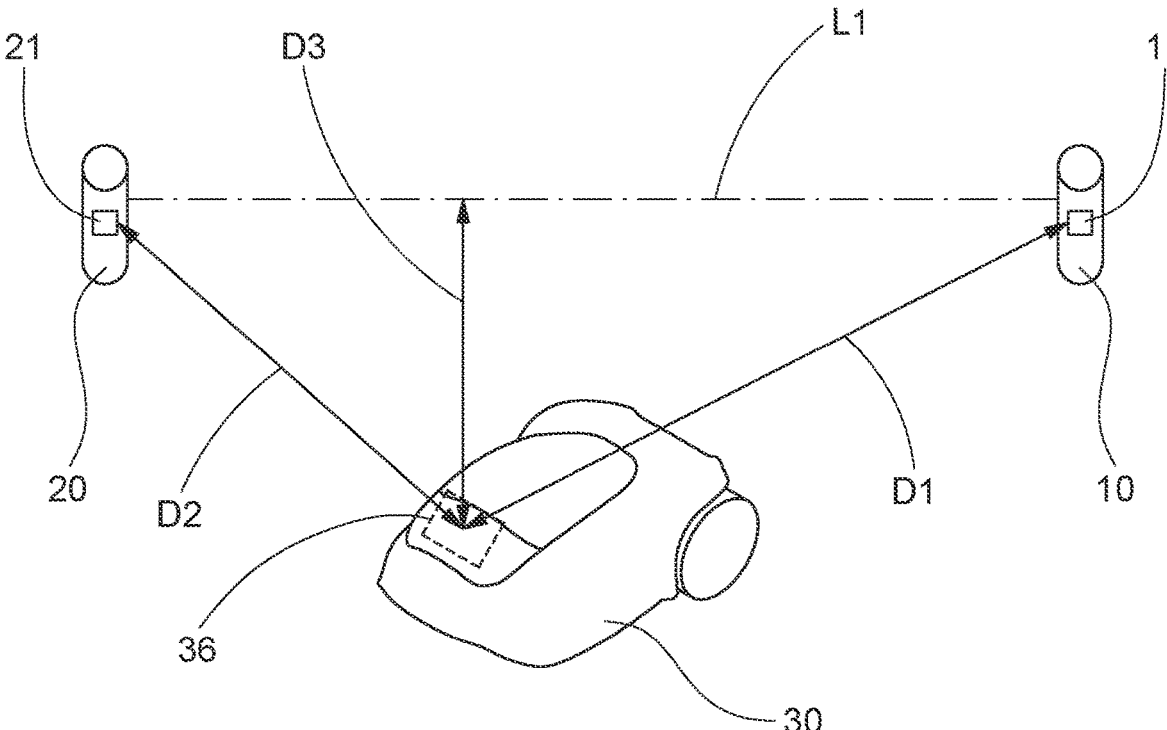

The first positioning member 10 has a first identification feature 11. The second positioning member 20 has a second identification feature 21, and the second positioning member 20 and the first positioning member 10 are spaced from each other (as shown in FIG. 2). The first and second positioning members 10, 20 can, but not limited to, be landscape gardening. The first and second identification features 11, 21 can, but not limited to, be patterns, characters or a combination of patterns and characters. In actual application, the first and second identification features 11, 21 can be attached to or printed on the first and second positioning members 10, 20, respectively.

The mowing robot 30 comprises a visual identification unit 31 and a computation unit 36. The visual identification unit 31 is used to identify a target, including one or more camera lenses 32, a driving tripod head 33 driving the camera lens 32 to rotate, and a database 34 storing a plurality of identification features 35. For example, the visual identification unit 31 can be equipped with one camera lens 32 that can be rotated 360 degrees, or two camera lenses 32 that can be individually rotated 180 degrees, or three camera lenses 32 that can be individually rotated 120 degrees. Therefore, the visual identification unit 31 has a 360-degree field of view. When the target is outside the field of view, the driving tripod head 33 drives the camera lens 32 to rotate until the target appears in the field of view, such that the target is identified by the visual identification unit 31.

In this embodiment, the visual identification unit 31 includes two camera lenses 32. One of the camera lenses 32 shoots the first identification feature 11 of the first positioning member 10, and the other of the camera lenses 32 shoots the second identification feature 21 of the second positioning member 20. When the first and second identification features 11, 21 correspond to the identification features 35 stored in the database 34, the visual identification unit 31 generates a first signal corresponding to the first identification feature 11 and a second signal corresponding to the second identification feature 21, and transmits the first and second signals to the computation unit 36 for facilitating subsequent operations of the computation unit 36.

Figure 3:
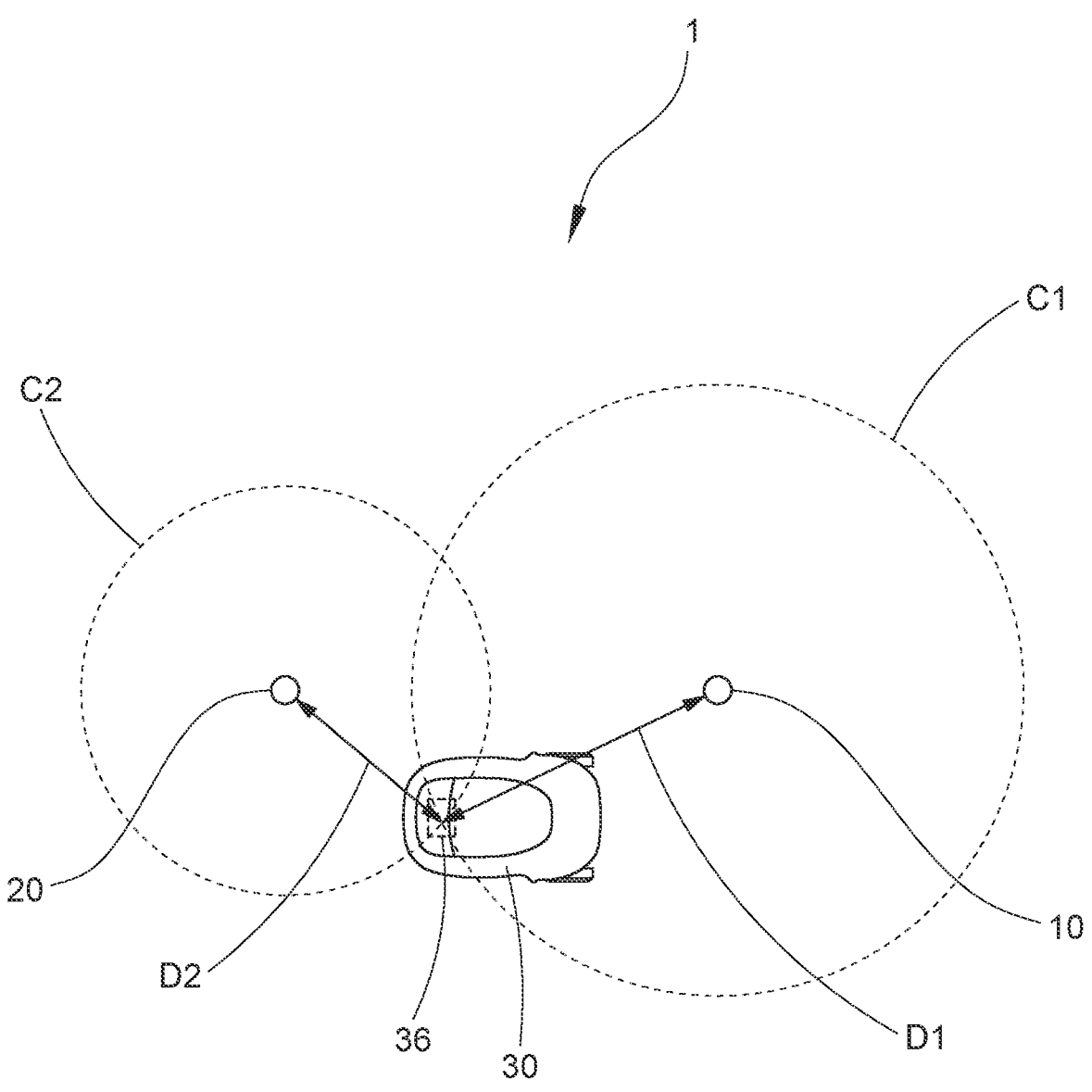
FIG. 3 is a top view of the visual identification positioning system of the first embodiment of the present invention, showing that the current location coordinate of the mowing robot is defined by the coordinate of the intersection of the first and second ranges.

As shown in FIG. 2, the computation unit 36 computes a first coordinate of the first positioning member 10, a second coordinate of the second positioning member 20, a first distance D1 between the mowing robot 30 and the first coordinate, and a second distance D2 between the mowing robot 30 and the second coordinate according to the first and second signals, wherein the first coordinate is a relative coordinate between the mowing robot 30 and the first positioning member 10, and the second coordinate is a relative coordinate between the mowing robot 30 and the second positioning member 20, and the first distance D1 is a relative distance between the mowing robot 30 and the first coordinate, and the second distance D2 is a relative distance between the mowing robot 30 and the second coordinate. In addition, the computation unit 36 defines a first boundary L1 between the first and second coordinates and computes a first spaced distance D3 between the mowing robot 30 and the first boundary L1. When the first spaced distance D3 is zero, the mowing robot 30 cannot cross the first boundary L1 and moves away from the first boundary L1. In this way, the movable range of the mowing robot 30 can be restricted by the first boundary L1. As shown in FIG. 3, the computation unit 36 defines a first range C1 that is defined by a circle with the first coordinate as a center and the first distance D1 as a radius, and defines a second range C2 that is defined with the second coordinate as a center and the second distance D2 as a radius. Then, the computation unit 36 computes a coordinate of the intersection of the first and second ranges C1, C2 (i.e., the intersection of two circles) as a current location coordinate of the mowing robot 30.

Figure 4:
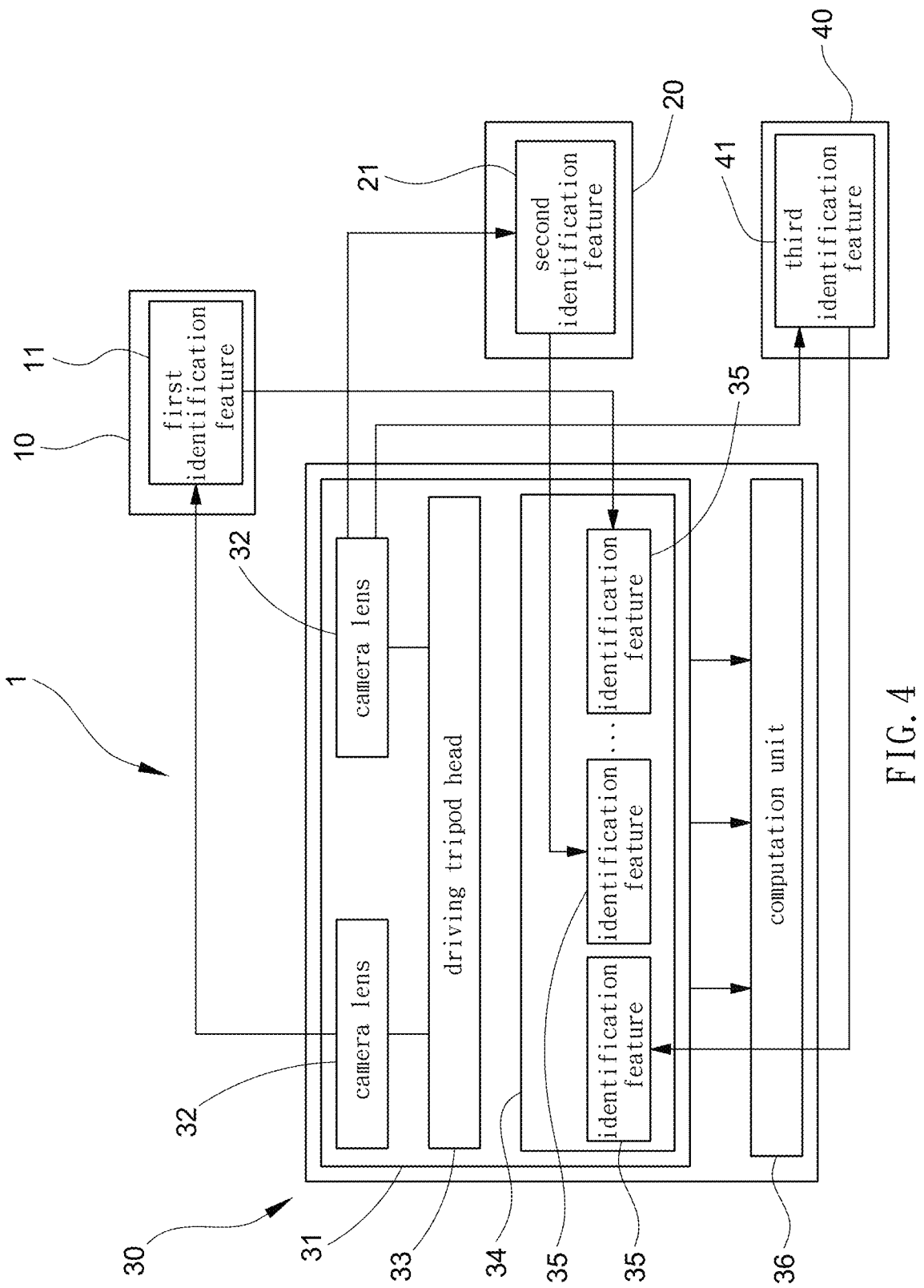
FIG. 4 is a system block diagram of the visual identification positioning system of a second embodiment of the present invention.

As show in FIG. 4, the main structure of the visual identification positioning system 2 provided by a second embodiment of the present invention is approximately the same with the first embodiment, but one of the differences therebetween is that the visual identification positioning system 2 further comprises a third positioning member 40 spaced from the first and second positioning members 10, 20. The third positioning member 40 has a third identification feature 41. The third positioning member 40 can, but not limited to, be landscape gardening. The third identification features 41 can, but not limited to, be patterns, characters or a combination of patterns and characters. In actual application, the visual identification unit 31 uses two camera lenses 32 to identify the first identification feature 11 of the first positioning member 10, the second identification feature 21 of the second positioning member 20, and the third identification feature 41 of the third positioning member 40. When the first, second, and third identification features 11, 21, 41 correspond to the identification features 35 stored in the database 34, the visual identification unit 31 generates the first signal corresponding to the first identification feature 11, the second signal corresponding to the second identification feature 21, and a third signal corresponding to the third identification feature 41, and transmits the first, second and third signals to the computation unit 36.

Figure 5:
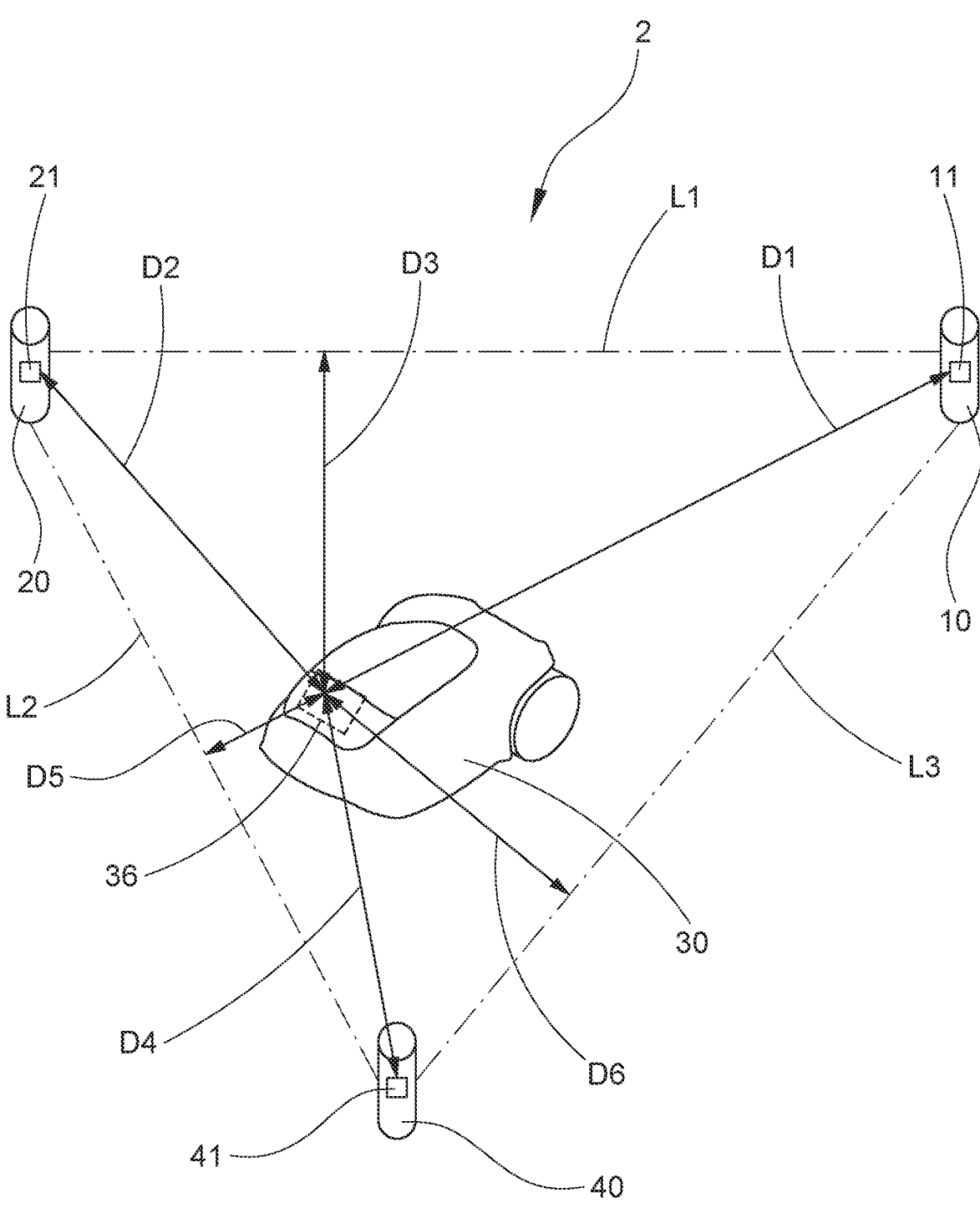
FIG. 5 is a perspective view of the visual identification positioning system of the second embodiment of the present invention, showing that the visual identification unit identifies the first, second, and third positioning members.

As shown in FIG. 5, the computation unit 36 computes the first coordinate of the first positioning member 10, the second coordinate of the second positioning member 20, a third coordinate of the third positioning member 40, the first distance D1 between the mowing robot 30 and the first coordinate, the second distance D2 between the mowing robot 30 and the second coordinate, and a third distance D4 between the mowing robot 30 and the third coordinate. In addition, the computation unit 36 defines the first boundary L1 between the first and second coordinates, a second boundary L2 between the second and third coordinates, and a third boundary L3 between the first and third coordinates according the first, second, and third signals, and computes the first spaced distance D3 between the mowing robot 30 and the first boundary L1, a second spaced distance D5 between the mowing robot 30 and the second boundary L2, and a third spaced distance D6 between the mowing robot 30 and the third boundary L3. When one of the first, second, and third spaced distances D3, D5, D6 is zero, the mowing robot 30 cannot cross one of the first, second, and third boundaries L1, L2, L3 and moves away from one of the first, second, and third boundaries L1, L2, L3. For example, when the third spaced distance D6 is zero, the mowing robot 30 cannot cross the third boundary L3 and moves away from the third boundary L3. In this way, the movable range of the mowing robot 30 can be restricted more precisely by the first, second, and third boundaries L1, L2, L3.

Figure 6:
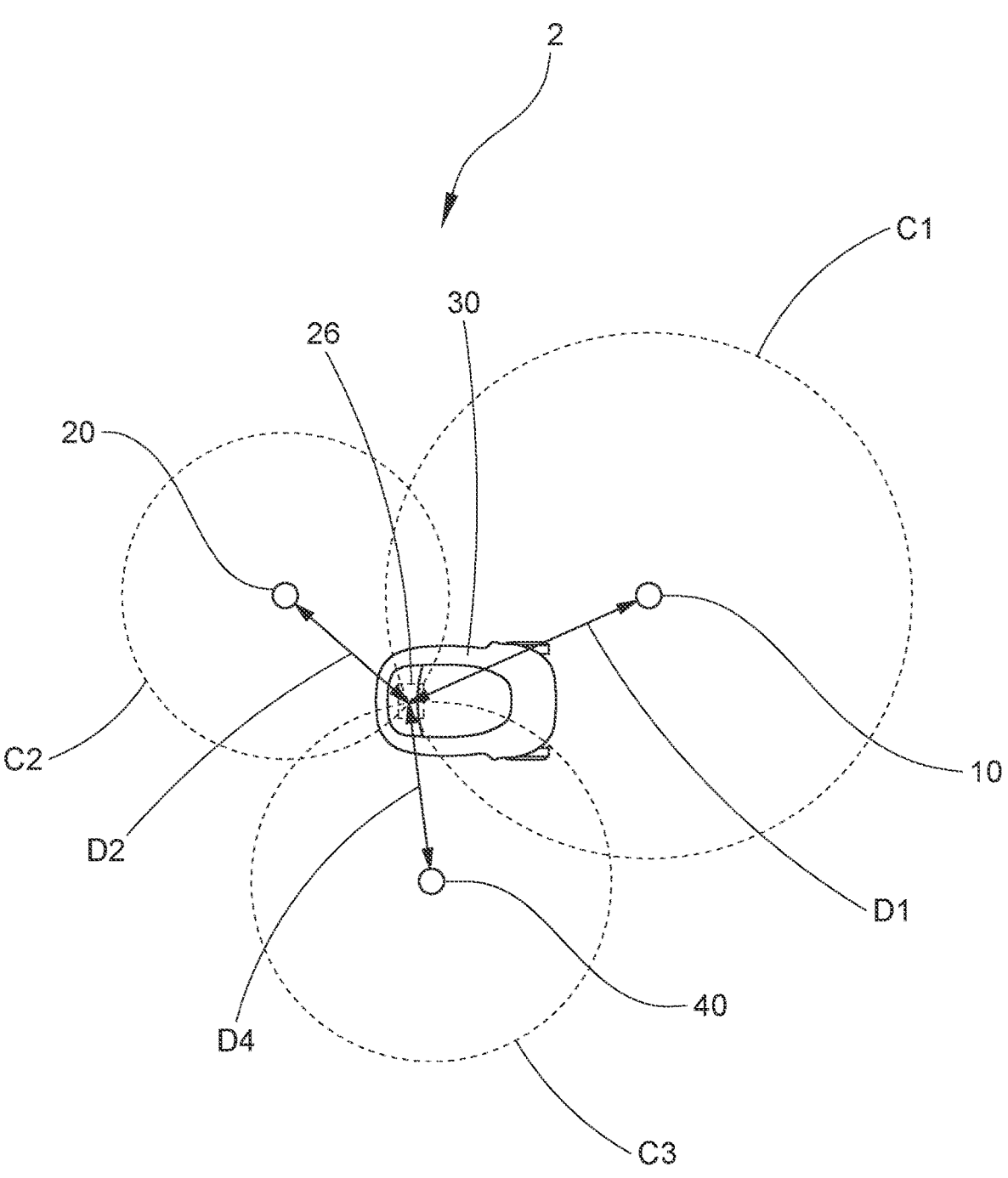
FIG. 6 is a top view of the visual identification positioning system of the second embodiment of the present invention, showing that the current location coordinate of the mowing robot is defined by the coordinate of the intersection of the first, second, and third ranges.

As shown in FIG. 6, the computation unit 36 defines a first range C1 that is defined by a circle with the first coordinate as a center and the first distance D1 as a radius, a second range C2 that is defined with the second coordinate as a center and the second distance D2 as a radius, and a third range C3 that is defined by a circle with the third coordinate as a center and the third distance D4 as a radius. Then, the computation unit 36 computes a coordinate of the intersection of the first, second, and third ranges C1, C2, C3 (i.e., the intersection of three circles) as a current location coordinate of the mowing robot 30. In this way, the current location coordinate of the mowing robot 30 can be more accurate by means of the first, second and third ranges C1, C2, C3 defined by the first, second and third positioning members 10, 20, 40. However, the number of the third positioning member 40 is not limited to those disclosed in this embodiment. The visual identification positioning system 2 of the present invention can provide a plurality of the third positioning members 40 to make the current location coordinate of the mowing robot 30 more accurate, and clearly limit the movable range of the mowing robot 30.

Figure 7:
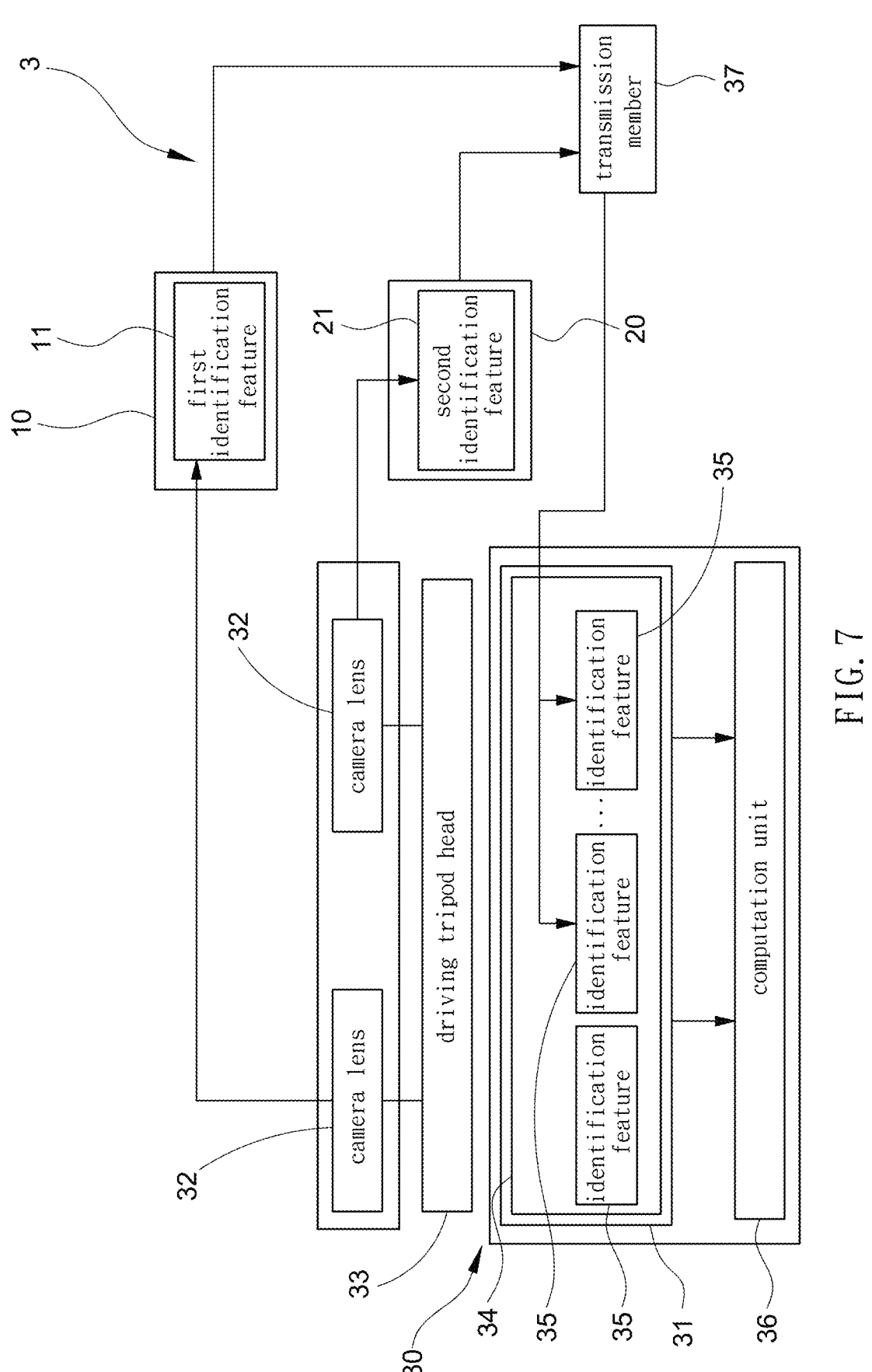
FIG. 7 is a system block diagram of the visual identification positioning system of a third embodiment of the present invention.
Figure 8:
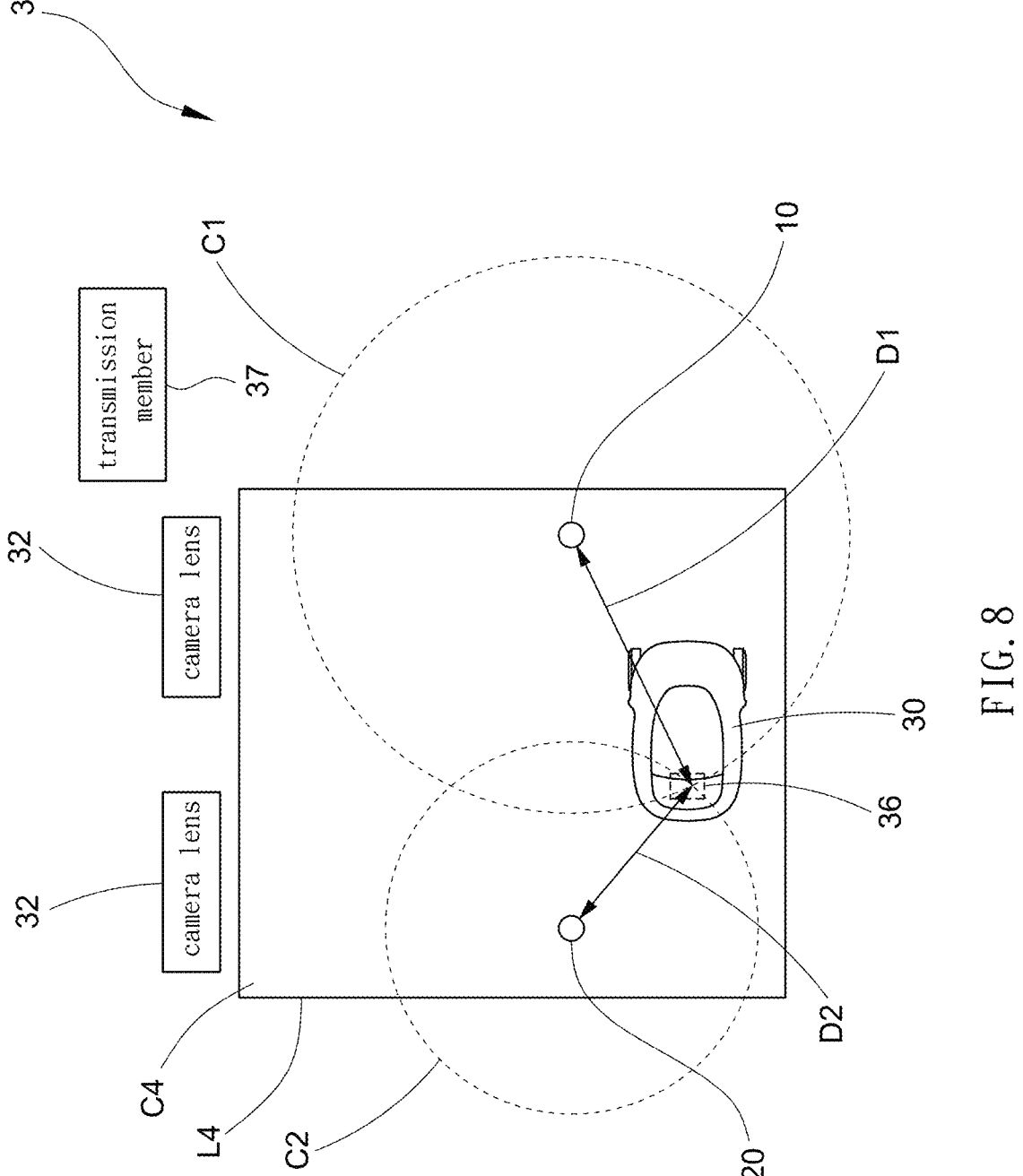
FIG. 8 is a top view of the visual identification positioning system of the third embodiment of the present invention, showing that the current location coordinate of the mowing robot is defined by the coordinate of the intersection of the first and second ranges.

As shown in FIG. 7, the main structure of the visual identification positioning system 3 provided by a third embodiment of the present invention is approximately the same with the first embodiment, but one of the differences therebetween is that the camera lenses 32 and the driving tripod head 33 are disposed outside the mowing robot 30 (such as a fence or roof near the mowing field), and a transmission member 37 is added. The camera lenses 32 are used for shooting the first and second identification features 11, 21. The transmission member 37 is used for receiving the first and second identification features 11, 21 shot by the camera lenses 32 and transmits the first and second identification features 11, 21 to the visual identification unit 31 of the mowing robot 30. When the first and second identification features 11, 21 correspond to the identification features 35 stored in the database 34 of the visual identification unit 31, the visual identification unit 31 generates the first signal corresponding to the first identification features 11 and the second signal corresponding to the second identification features 21 and transmits the first and second signals to the computation unit 36. The computation unit 36 computes the first coordinate of the first positioning member 10, the second coordinate of the second positioning member 20, the first distance D1 between the mowing robot 30 and the first coordinate, and the second distance D2 between the mowing robot 30 and the second coordinate according to the first and second signals, as shown in FIG. 8. Thereafter, as shown in FIG. 8, the computation unit 36 defines the first range C1 that is defined by a circle with the first coordinate as a center and the first distance D1 as a radius, and defines the second range C2 that is defined with the second coordinate as a center and the second distance D2 as a radius, and then the computation unit 36 computes a coordinate of the intersection of the first and second ranges C1, C2 (i.e., the intersection of two circles) as the current location coordinate of the mowing robot 30. However, in this embodiment, the transmission member 37 can directly compute the current location coordinate of the mowing robot 30 and transmit the current location coordinate to the mowing robot 30 for positioning; that is to say, the mowing robot 30 can substitute the transmission member 37 for the computation unit 36.

Figure 9:
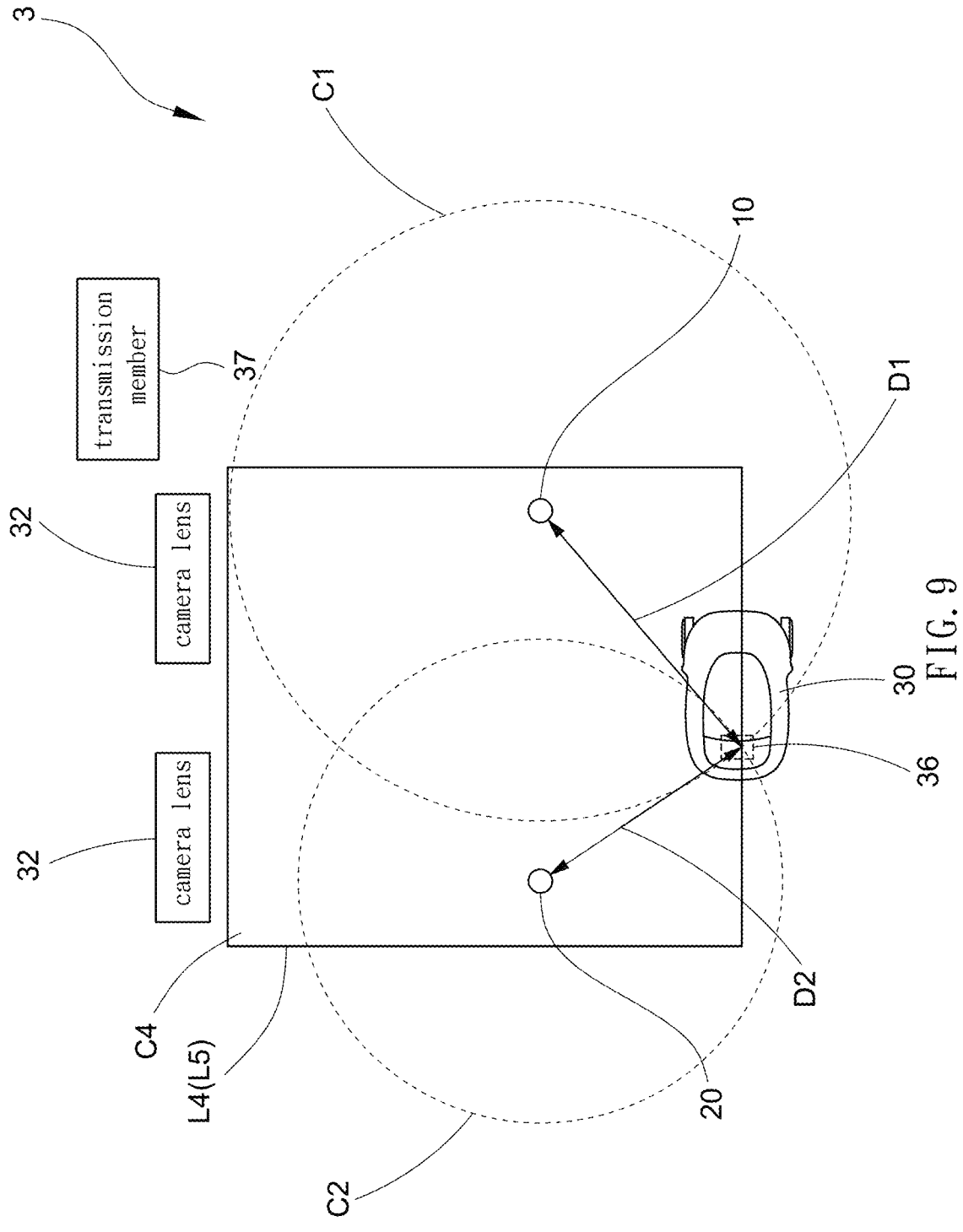
FIG. 9 is similar to FIG. 8, showing that the mowing robot is located at the boundary of the mowing area, and the current location coordinate of the mowing robot is defined by the coordinate of the intersection of the first and second ranges.

Further, the camera lenses 32 can shoot a mowing area C4 of the mowing robot 30 and a boundary L4 of the mowing area C4, and the transmission member 37 transmits an information including the mowing area C4 and the boundary L4 to the computation unit 36. As shown in FIG. 8, the computation unit 36 uses the first and second positioning members 10, 20 to compute the current location coordinate to the mowing robot 30, and as shown in FIG. 9, when the mowing robot 30 moves to the boundary L4 of the mowing area C4, the computation unit 36 computes the current location coordinate to the mowing robot 30, and the mowing robot 30 moves along the boundary L4 of the mowing area C4. As such, the mowing robot 30 records all current location coordinate of the mowing robot 30 when moving along the boundary L4, such that a new boundary L5 with the aforesaid information is defined by using the aforesaid current location coordinates. In theory, the new boundary L5 is coincided with the boundary L4 shot by the camera lenses 32. In this way, it is unnecessary for the camera lenses 32 to repeatedly shoot the mowing area C4 and the boundary L4. As long as the mowing robot 30 acquires the current location coordinate, the mowing robot 30 can judge itself whether close to or even located at the new boundary L5 (i.e., the boundary L4). Therefore, the mowing robot 30 can be ensured that it will only move to the boundary L4 of the mowing area C4 at most without going beyond the boundary L4.

As indicated above, the visual identification positioning system 1, 2, 3 of the present invention can acquire the current location coordinate of the mowing robot 30 without using satellite positioning, and further, the first, second, and third positioning members 10, 20, 40 are easy to be manufactured in large quantities, so the visual identification positioning system 1, 2, 3 of the present invention provides a relatively simple and fast positioning way and has a lower cost when compared to the prior art.

What is claimed is:

1. A visual identification positioning system comprising:
a first positioning member having a first identification feature;
a second positioning member spaced from the first positioning member and having a second identification feature; and
a mowing robot including a visual identification unit and a computation unit, the visual identification unit identifying the first identification feature of the first positioning member and the second identification feature of the second positioning member to generate a first signal and a second signal and transmit the first and second signals to the computation unit, the computation unit computing a first coordinate of the first positioning member, a second coordinate of the second positioning member, a first distance between the mowing robot and the first coordinate, and a second distance between the mowing robot and the second coordinate according to the first and second signals, and defining first and second ranges with the first and second coordinates as centers of the first and second ranges according to the first and second distances, and computing a coordinate of at least one intersection of the first and second ranges as a current location coordinate of the mowing robot.

2. The visual identification positioning system as claimed in claim 1, wherein the computation unit defines a first boundary between the first and second coordinates according to the first and second signals, and computes a first spaced distance between the mowing robot and the first boundary; when the first spaced distance is zero, the mowing robot cannot cross the first boundary and moves away from the first boundary.

3. The visual identification positioning system as claimed in claim 2, wherein the first and second ranges are defined with the first and second coordinates as centers of the first and second ranges and the first and second distances as radiuses, respectively.

4. The visual identification positioning system as claimed in claim 3, further comprising a third positioning member spaced from the first and second positioning members and having a third identification feature; the visual identification unit identifies the third identification feature of the third positioning member to generate a third signal and transmit the third signal to the computation unit; the computation unit computes a third coordinate of the third positioning member, a third distance between the mowing robot and the third coordinate, and defines the first range, the second range, and a third range with the first, second, and third coordinates as centers of the first, second, and third ranges according to the first, second and third distances, and computes a coordinate of an intersection of the first, second, and third ranges as the current location coordinate of the mowing robot.

5. The visual identification positioning system as claimed in claim 4, wherein the computation unit defines the first boundary between the first and second coordinates, a second boundary between the second and third coordinates, and a third boundary between the first and third coordinates according the first, second, and third signals, and computes the first spaced distance between the mowing robot and the first boundary, a second spaced distance between the mowing robot and the second boundary, and a third spaced distance between the mowing robot and the third boundary; when one of the first, second, and third spaced distances is zero, the mowing robot cannot cross one of the first, second, and third boundaries and moves away from one of the first, second, and third boundaries.

6. A visual identification positioning system comprising:
a first positioning member having a first identification feature;
a second positioning member spaced from the first positioning member and having a second identification feature;
at least one camera lens shooting the first identification feature of the first positioning member and the second identification feature of the second positioning member;
a transmission member receiving and transmitting the first and second identification features shot by the camera lens; and
a mowing robot including a visual identification unit and a computation unit, the visual identification unit receiving the first and second identification features transmitted by the transmission member and generating a first signal and a second signal and transmitting the first and second signals to the computation unit, the computation unit computing a first coordinate of the first positioning member, a second coordinate of the second positioning member, a first distance between the mowing robot and the first coordinate, and a second distance between the mowing robot and the second coordinate according to the first and second signals, and defining first and second ranges with the first and second coordinates as centers of the first and second ranges according to the first and second distances, and computing a coordinate of at least one intersection of the first and second ranges as a current location coordinate of the mowing robot.

7. The visual identification positioning system as claimed in claim 6, wherein the first and second ranges are defined with the first and second coordinates as centers of the first and second ranges and the first and second distances as radiuses, respectively.

8. The visual identification positioning system as claimed in claim 7, wherein the camera lens shoots a mowing area and a boundary of the mowing area; the transmission member transmits an information corresponding to the mowing area and the boundary to the computation unit; when the mowing robot moves to the boundary of the mowing area, the mowing robot moves along the boundary of the mowing area, and a new boundary of the mowing area is defined by a current location coordinate of the mowing robot moving along the boundary.

\* \* \* \* \*